US008312459B2

(12) United States Patent
Smith et al.

(10) Patent No.: US 8,312,459 B2
(45) Date of Patent: *Nov. 13, 2012

(54) USE OF RULES ENGINE TO BUILD NAMESPACES

(75) Inventors: Frederick J. Smith, Redmond, WA (US); Jeff L. Havens, Issaquah, WA (US); Madhusudhan Talluri, Bellevue, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1163 days.

This patent is subject to a terminal disclaimer.

(21) Appl. No.: 11/301,071

(22) Filed: Dec. 12, 2005

(65) Prior Publication Data

US 2007/0134069 A1    Jun. 14, 2007

(51) Int. Cl.
*G06F 9/46* (2006.01)
(52) U.S. Cl. ........................................................ 718/104
(58) Field of Classification Search .................... 718/104
See application file for complete search history.

(56) References Cited

U.S. PATENT DOCUMENTS

| 5,214,778 | A | * | 5/1993 | Glider et al. ........................ 714/2 |
| 5,682,530 | A | * | 10/1997 | Shimamura ................... 718/104 |
| 5,923,884 | A | | 7/1999 | Peyret et al. |
| 6,374,286 | B1 | | 4/2002 | Gee et al. |
| 6,408,298 | B1 | | 6/2002 | Van et al. |
| 6,529,966 | B1 | * | 3/2003 | Willman et al. ................. 710/10 |
| 6,532,505 | B1 | | 3/2003 | Stracovsky et al. |
| 6,961,941 | B1 | | 11/2005 | Nelson et al. |
| 7,103,661 | B2 | | 9/2006 | Klein |
| 7,185,192 | B1 | * | 2/2007 | Kahn ............................. 713/155 |
| 7,188,339 | B2 | | 3/2007 | Qureshi |
| 7,389,512 | B2 | * | 6/2008 | Tucker .......................... 719/313 |

(Continued)

FOREIGN PATENT DOCUMENTS

EP        1 475 703        11/2004

(Continued)

OTHER PUBLICATIONS

Wright, C., Kernel Korner—Unionfs: bringing filesystems together, *Linux Journal*, 2004, http://www.linuxjournal.com/article/7714, downloaded from the Internet on Apr. 27, 2006, 18 pages.

(Continued)

*Primary Examiner* — Meng An
*Assistant Examiner* — Blake Kumabe
(74) *Attorney, Agent, or Firm* — Woodcock Washburn LLP

(57) ABSTRACT

A containment mechanism provides for the grouping and isolation of multiple processes running on a single computer using a single instance of the operating system. A system environment is divided into one or more side-by-side and/or nested spaces enabling the partitioning and controlled sharing of resources by creating different views of hierarchical name spaces via virtual hierarchies. A set of declarative rules specifying access capabilities may specify a set of filter drivers to be used to limit access to nodes in the hierarchical name space. The rules may be applied in sequence to construct a new name space from an existing one, or to add to an existing hierarchy. Filter drivers are used to limit access to nodes in the new name space or new portion of the name space. Access to nodes can be limited (read-only access instead of read/write) or nodes can be hidden altogether. Rules may be specified in a declarative language such as XML.

16 Claims, 9 Drawing Sheets

U.S. PATENT DOCUMENTS

| | | |
|---|---|---|
| 7,447,896 B2 | 11/2008 | Smith et al. |
| 7,461,080 B1 | 12/2008 | Tucker |
| 2001/0004753 A1 | 6/2001 | Dell et al. |
| 2002/0095479 A1* | 7/2002 | Schmidt ........................ 709/218 |
| 2002/0095500 A1* | 7/2002 | Schmidt ........................ 709/226 |
| 2003/0110188 A1 | 6/2003 | Howard et al. |
| 2004/0030731 A1 | 2/2004 | Iftode et al. |
| 2004/0226015 A1* | 11/2004 | Leonard et al. ............... 718/100 |
| 2005/0021788 A1 | 1/2005 | Tucker et al. |
| 2005/0091214 A1 | 4/2005 | Probert et al. |
| 2005/0091658 A1 | 4/2005 | Kavalam et al. |
| 2005/0125537 A1* | 6/2005 | Martins et al. ................ 709/226 |
| 2006/0075123 A1 | 4/2006 | Burr et al. |
| 2006/0090171 A1 | 4/2006 | Laborczfalvi et al. |
| 2006/0230042 A1 | 10/2006 | Butler et al. |
| 2006/0282658 A1 | 12/2006 | Tang |
| 2007/0134070 A1 | 6/2007 | Smith et al. |
| 2007/0136356 A1 | 6/2007 | Smith et al. |
| 2007/0136723 A1 | 6/2007 | Smith et al. |

FOREIGN PATENT DOCUMENTS

| | | |
|---|---|---|
| WO | WO 2004/027613 | 4/2004 |
| WO | WO 2004/068722 | 8/2004 |
| WO | WO 2007/070535 | 6/2007 |
| WO | WO 2007/070555 | 6/2007 |

OTHER PUBLICATIONS

Kamp et al., "Jails: Confining the omnipotent root," The FreeBSD Project, downloaded May 15, 2009, pp. 1-15.

"System Administration Guide: Solaris Containers Resource Management and Solaris Zones," Sun Microsystem, Inc., 2009, pp. 1-506.

* cited by examiner

USE OF RULES ENGINE TO BUILD NAMESPACES

CROSS-REFERENCE TO RELATED CASES

This application is related in subject matter to U.S. patent application Ser. No. 11/301,093, entitled "Using Virtual Hierarchies to Build Alternative Namespaces" filed Dec. 12, 2005, U.S. patent application Ser. No. 11/301,066, entitled "OS Mini Boot for Running Multiple Environments" filed Dec. 12, 2005, U.S. patent application Ser. No. 11/301,072 entitled "Mechanism for Drivers to Create Alternate Namespaces" filed Dec. 12, 2005, and U.S. patent application Ser. No. 11/301,065, entitled "Building Alternative Views Of Name Spaces" filed Dec. 12, 2005.

BACKGROUND

When a single computer is used to run multiple workloads, a balance should be struck between isolation of applications and the cost of using and administering the application-isolating system. Applications should ideally be isolated from each other so that the workload of one application does not interfere with the operation or use of resources of another application. On the other hand, the system should be flexible and manageable to reduce the cost of using and administering the system. Ideally, the system should be able to selectively share resources while maintaining application isolation. Typically, however, all processes running under the same user account have the same view of system resources. The lack of isolation of the applications running on a particular computer contributes to application fragility, application incompatibility, security problems and the inability to run conflicting applications on the same machine.

A number of different solutions have been proposed which address one or more aspects of the problems discussed above. One way to isolate applications running on the same machine is to run the applications on different "virtual machines". A virtual machine (VM) enables multiple instances of an operating system (OS) to run concurrently on a single machine. A VM is a logical instance of a physical machine, that is, a virtual machine provides to the operating system software an abstraction of a machine at the level of the hardware: that is, at the level of the central processing unit (CPU), controller, memory, and so on. Each logical instance has its own operating system instance with its own security context and its own isolated hardware resources so that each operating system instance appears to the user or observer to be an independent machine. VMs are typically implemented to maximize hardware utilization. A VM provides isolation at the level of the machine but within the virtual machine, no provisions for isolating applications running on the same VM are provided for by known VM implementations.

Other known proposed solutions to aspects of the problems described above include SUN MICROSYSTEM'S SOLARIS ZONES, jails for UNIX BSD and LINUX, the VSERVERS project for LINUX, SWSOFT'S VIRTUOZZO, web hosting solutions from ENSIM and SPHERA, and software available from POLICYMAKER, and SOFTRICITY.

Another approach that addresses aspects of application isolation is hardware partitioning. A multi-processor machine is divided into sub-machines, each sub-machine booting an independent copy of the OS. Hardware partitioning typically only provides constrained resource allocation mechanisms (e.g., per-CPU allocation), does not enable input/output (IO) sharing and is typically limited to high-end servers.

Hence, in many systems, limited points of containment in the system exist at the operating system process level and at the machine boundary of the operating system itself, but in between these levels, security controls such as Access Control Lists (ACLs) and privileges associated with the identity of the user running the application are used to control process access to resources. There are a number of drawbacks associated with this model. Because access to system resources is associated with the identity of the user running the application rather than with the application itself, the application may have access to more resources than the application needs. Because multiple applications can modify the same files, incompatibility between applications can result. There are a number of other well-known problems as well.

There is no known easy and robust solution using known mechanisms that enables applications to be isolated while still allowing controlled sharing of resources. It would be helpful if there were a mechanism that allowed an application, process, group of applications or group of processes running on a single machine to be isolated using a single operating system instance while enabling controlled sharing of resources.

SUMMARY

An intra-operating system isolation/containment mechanism called herein a silo provides for the grouping and isolation of multiple processes running on a single computer using a single instance of the operating system. A single instance of the operating system divides the system into multiple side-by-side and/or nested isolated environments (silos) enabling the partitioning and controlled sharing of resources by providing a view of a system name space to processes executing within the silos. That is, a single OS image serving the computer employs the mechanism of name space containment to constrain which process, group of processes, application or group of applications can use which resource(s). Restricting access to resources is therefore directly associated with or based on the silo the process or application is placed in because if a process or application is unable to resolve a name used to access a resource, it will be unable to use the resource. More particularly, controlled sharing of resources among the spaces may be implemented via name space containment of hierarchical names spaces including the file system, registry, object manager, or others. The silo also provides the ability to impose other restrictions on all processes contained within a given silo by rewriting access capabilities and/or by applying a set of rules evaluated by a rules engine. New points of containment are provided at the process level, group of processes level, application level, or group of applications level. A silo provides an abstraction at the level of a high level operating system—(e.g., at the level of files, directories, objects and semaphores) to the applications and processes within the silo by enabling the applications and processes to run within the silo's view of the system or parent hierarchy. A process running in a silo is only able to access the subset of the global system name space which the silo's view presents. Names are resolved relative to the view of the global name space. For example, when a request using a relative reference is processed, the name referenced is resolved relative to the silo's name space, so that the process is not able to "escape" from the silo.

A silo-specific view of the system (or view of the parent hierarchy in the case of a nested silo) may be created by creating and exposing a virtual hierarchy or tree, the nodes of which may be linked back to a node or name in a physical hierarchy associated with the external system space in which the silo resides (or to a node or name in a parent silo). A virtual hierarchy is volatile. It is not persisted to permanent storage (e.g., is not written to disk or to other stable storage media) but resides only in memory or other volatile storage media and may be created dynamically as the silo is initiated. When the silo exits, the virtual hierarchy may be discarded. The physical hierarchy, in contrast, is permanent (persisted to stable storage) and is independent of the existence or non-existence of the silo. A silo may be implemented by having the silo provide the root for the processes running in the silo. For example, the silo may provide the root of a virtual directory to be used by a process running in the silo. The provided root may represent the root of the file system directory for the process in the silo. A process within the silo cannot see or express any names above the virtual root. One or more hierarchies may be associated with a silo.

A virtual hierarchy is created by grafting branches from the system hierarchy onto nodes directly or indirectly attached to the virtual root associated with the silo. For the virtual file system, the grafting operation makes either a file or a directory appear at one or more places within the process's virtual file system directory. The file system implementation effectively builds a new file system view over the system's physical file system name space or over the parent's file system name space. This concept may also be applied to other hierarchical name spaces such as but not limited to the file system, the registry and the object manager name spaces.

A silo-specific view of the system hierarchy (or of a parent hierarchy in the case of a nested silo) may be created by creating and exposing a new silo hierarchy or a new branch of an existing system (or parent) hierarchy, some or all of the nodes of which may be linked back to a node or name in a parent silo hierarchy or to a node or name in a global system hierarchy associated with the external system space in which the silo resides. The new silo hierarchy or branch may be virtual. A virtual hierarchy is volatile. It is not persisted to permanent storage (e.g., is not written to disk or to other stable storage media) but resides only in memory and may be created dynamically as the processes within the silo run and as silos are created and destroyed. The physical hierarchy in contrast, is permanent (persisted to stable storage) and is independent of the existence or non-existence of the silo. The root of the silo hierarchy may be the default hierarchy that the applications running in the silo use for starting operations. Thus a silo may be implemented by having the silo provide the root for the processes running in the silo. A process within the silo cannot see or express any names above the silo root. One or more hierarchies may be associated with a silo.

For some hierarchical name spaces, a view is created using a mapping function that maps physical nodes in one name space to physical nodes in another. That is, all the sub-root nodes of the silo hierarchy are junctions back to the system hierarchy (or to the parent hierarchy for child silos). This approach may be used for a hierarchy such as the registry. For the silo registry, the grafting operation described above makes a key or a value appear at one or more places within the silo registry.

For other hierarchical name spaces such as but not restricted to those which exist only temporarily in memory or other volatile storage while the system or silo is running, a view of the system name space may be generated by creating a new branch of the system or parent hierarchy for each isolated environment. Junctions may be created via symbolic links. A process running in an isolated environment is only able to create symbolic links within its name space. Similarly, when a symbolic link is resolved for a process running in the isolated environment, it is resolved relative to its view of the system name space. One such hierarchical name space is the object manager name space. A new branch of the physical system hierarchy may be created for each silo in the object manager hierarchy, which is created and stored only in volatile storage. The silo branch provides a view into the system object manager name space for the silo. Normal object manager symbolic links are used to junction to nodes within the object manager hierarchy. To ensure that a process running within a silo does not escape from the silo, when a process in a silo issues a request to create a symbolic link, the target name (the node the link points to) is resolved relative to the silo's name space so that the creation of symbolic links is limited to the silo name space.

When a branch is added to the system hierarchy for each silo, the access capabilities for the branch may be specified. For example, the access capabilities may specify that a node or branch of the silo hierarchy is by default read-only when opened through the silo. That is, if a branch grafted onto the system hierarchy for the silo is allowed only read-only access capability, each node in the grafted branch is also by default only read-only. Alternatively, rules may be associated with one or more nodes in the silo branch to provide a richer control mechanism for nodes within the grafted branch.

A set of declarative rules specifying access capabilities may be used to limit access to nodes in the hierarchical name space. The rules may be applied to construct a new name space from an existing one by, for example, filtering out directory entries so that only a subset of the original name space is visible to the silo. Access to nodes can be limited (read-only access instead of read/write) or nodes can be hidden altogether. Rules may be specified in any suitable way. One such format is via a declarative language such as XML.

DETAILED DESCRIPTION

Overview

Figure 1:
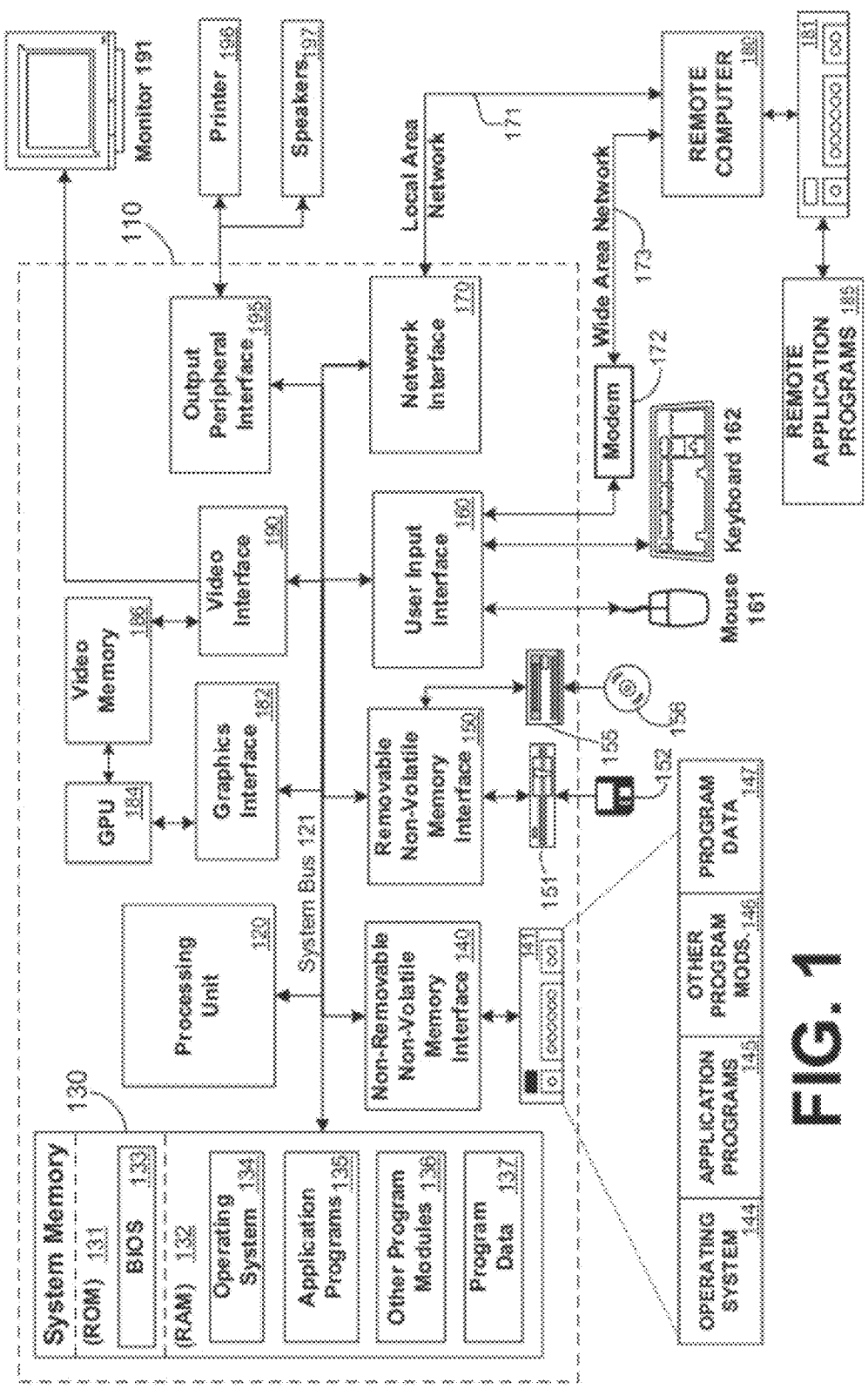
FIG. 1 is a block diagram illustrating an exemplary computing environment in which aspects of the invention may be implemented.

A resource management system controls the use of various system resources such as memory, CPU time, IO bandwidth and so on. One or more of three kinds of links may be used to point to resources: hard links, symbolic links and aliases. A hard link is a reference or pointer to the physical data on a volume. In most file systems, all named files are hard links. The name associated with the file is a label that refers the operating system to the actual data. More than one name can be associated with the same data but the data must exist in the same file system. A symbolic link is a type of link used in Unix, for example, which refers to another file by its pathname. In contrast with hard links, there are no restrictions on where a symbolic link can point. It can refer to a file on another file system, to itself or to a file which does not even exist (detected as a problem only when the link is accessed). An alias is designed to maintain a link to its original file even if the original file is moved or renamed.

Secure access to resources can be based on access control lists (ALCs) or on capabilities. Most commercial resource management systems, including some Microsoft WINDOWS operating systems, use access control lists to control access to resources. Because of the widespread use of ACL-based permission controls, multiple applications are often allowed to share resources. Access to the resources is based on privileges associated with the identity of the person running the application or process rather than being based on the needs and characteristics of the application itself. This approach can be problematic. For example, a user may have broad access privileges (e.g., administrator status) because some of the programs he runs need that level of access. For example, because program_1 run by user_1 needs access to files one to ten, user_1's access privileges must permit him to access files one to ten. Suppose program_2 only needs access to files one and two. When user_1 runs program_2, program_2 will nevertheless have access to files one to ten, because user_1's privileges allow access to files one to ten. Thus, because file system operations are based on ACL-based permission controls, in general, the file system name space can be and generally is more or less global to all the processes launched by user_1 running on the machine. ACL-based permission controls lead to a number of problems including: a program could waste processing time handling things it should not consider, the presence of a new file that the program is not expecting might cause the program to operate incorrectly, different programs may write or modify the same file, causing interference and so on. This problem is exacerbated because not all programs have the same level of trustworthiness. Program_1 may not be as trustworthy as program_1 but since the user's privileges allow him to access files one to ten, program_2 has access to files one to ten and may maliciously modify them. In addition, there may be occasions when it is desirable to provide different programs different files even though the programs use the same name for the file. Finally, different programs may use the same name but mean different files. Hence, there is a need for better control of shared resources than that which can easily be obtained using ACLs and privileges.

One very common resource is a file. A file system is a method for storing and organizing computer files and the data the files contain, on storage (e.g., on disk). Most file systems use an underlying non-volatile data storage device on which files are persisted. A typical storage device provides access to an array of fixed-size blocks, sometimes called sectors, which are generally 512 bytes each. The file system software is responsible for organizing these sectors into files and directories. The file system also keeps track of which sectors belong to which file and which sectors are not being used. Traditional file systems offer facilities to create, move and delete both files and directories.

Another common resource is the registry. The registry is a central hierarchical database used in certain operating systems including Microsoft Windows 9x, Windows CE, Windows NT, and Windows 2000. The registry is used to store information necessary to configure the system for one or more users, applications and hardware devices. The registry includes information that the operating system refers to during operation. This information includes data such as profiles for each user, the applications installed on the computer and the types of documents that each can create, property sheet settings for folders and application icons, what hardware exists on the system, and the ports that are being used. The registry might be analogized to a file system optimized for very small files. In the registry, directories are replaced by keys and files are replaced by values.

Other common resources are the system objects managed by an object manager and stored in an object manager name space. The object manager provides a resource management support infrastructure that executive subsystems (including the memory manager, I/O manager, and process manager) rely on. One way a program accesses a resource such as a file is to open or create the resource. A resource is typically assigned a name when it is created so that it can be shared. To look up or open an existing shared resource or a global resource (e.g., a file system, disk, or other physical device attached to the system), a program specifies the resource name. Resources (such as files and shared virtual memory) may be represented as object data structures, defined by the object manager. Objects may be implemented as shells that other executive subsystems can fill in so that custom object types can be built. The object manager tracks information that is independent of the type of resource an object represents. The subsystem-specific core of an object contains data relevant to a particular resource.

Creating objects is advantageous because each subsystem does not need to redo work to track the system-related state of an object, look up its resources, charge applications for the memory required to allocate an object, and protect resources with security. By concentrating these functions in the object manager, security code and naming conventions can be shared across subsystems. The object manager creates object types, creates and deletes objects, queries and sets object attributes, and locates objects. An object type stores information common to all objects representing the same type of resource. When an executive subsystem initializes, a function in the object manager is called to define the appropriate object types.

To address the need for a more powerful access control mechanism for resources (such as files, registry entries and system objects), than that provided for by ACLs, the silo containment mechanism is introduced that enables the creation of a new isolated environment in which a process, program, set of programs or application can run. In some embodiments a view of a system hierarchy is created by applying a set of rules to construct the view for the isolated environment. The new view is associated with the isolated environment. Rules may be used to limit access to resources and to hide resources in a nest-able fashion. The rules may be applied when constructing a silo view of a hierarchy by constructing a new virtual or physical hierarchy or when constructing a new branch of an existing hierarchy. In each case, the silo-specific view is implemented by creation of the new hierarchy or new branch, as directed by the rules. Directives controlling access to the nodes of the hierarchy or branch may be stored in the nodes of the structure and dynamically evaluated and enforced at runtime or during processing, such as, for example, when a request for access to a node is received. In some cases, the new silo hierarchy may be created by joining pieces of the global hierarchy to the leaf nodes of a virtual hierarchy, to create a silo-specific view of the system hierarchy. In other cases, the new hierarchy is created and then nodes of the new hierarchy are mapped to nodes in a physical system hierarchy. Alternatively, a new silo-specific branch may be added to an existing hierarchy. Symbolic links may link nodes in the silo-specific branch to nodes in the existing hierarchy. In some cases, the silo hierarchy is stored only in volatile storage (e.g., memory), so that when the silo exits (normally or abnormally), the silo hierarchy disappears. In some cases, the silo hierarchy is independent of and has no effect on the system hierarchy which is stored or persisted on non-volatile storage media. The system hierarchy may be stored only in volatile storage or may be stored in non-volatile storage. The new silo hierarchy provides a view of the global hierarchy for the process, program, set of programs or application running in the silo.

Rules may be applied during the construction of the view (creation of the silo hierarchy) and also dynamically during processing, such as for example, when access to a resource is requested. Rules may be implemented through the use of a rules engine and filter drivers, as described more fully below.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Use of a Rules Engine to Build Alternative Hierarchical Name Spaces

Figure 2:
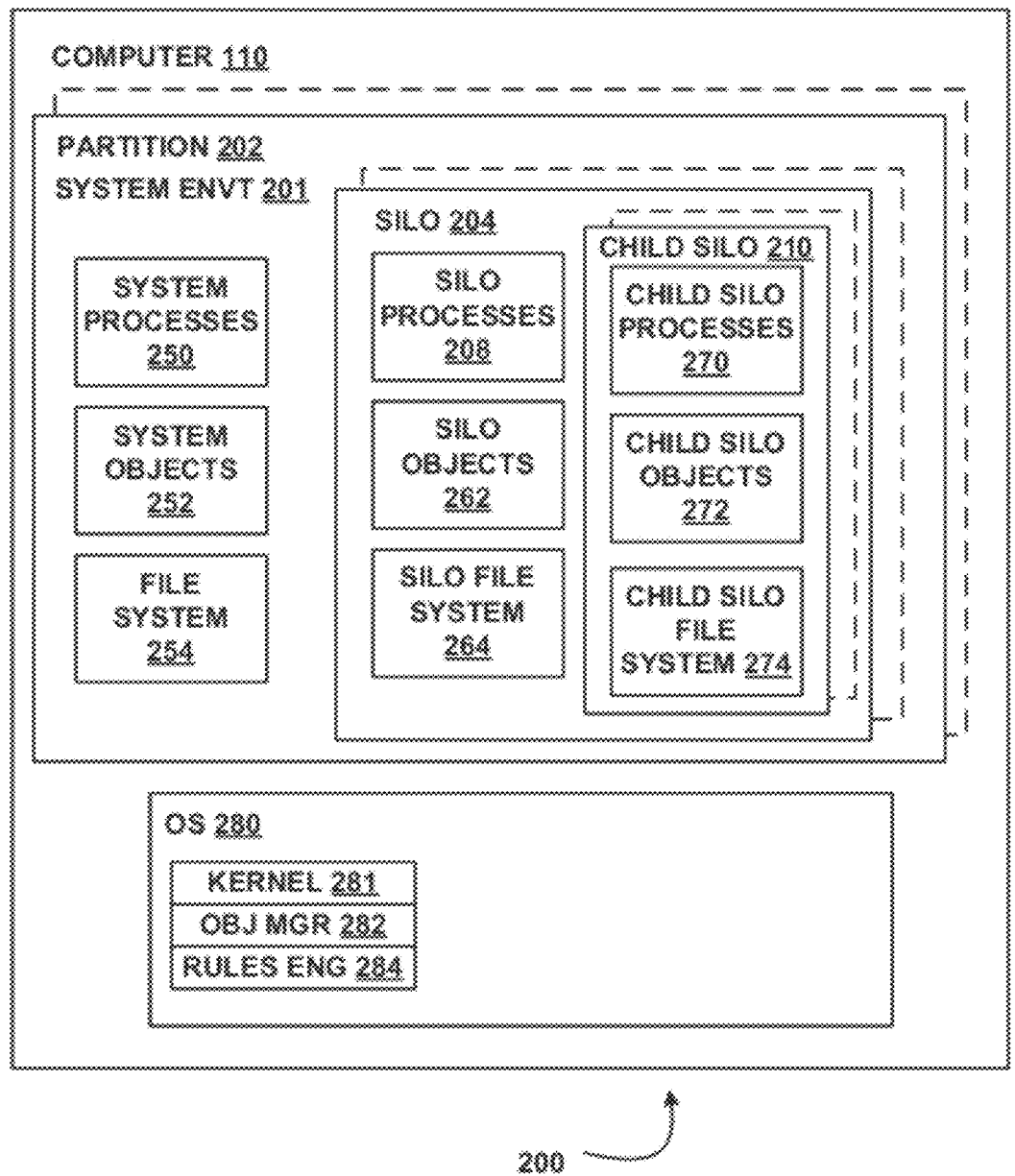
FIG. 2 is a block diagram of a system for creating and using virtual hierarchies to build alternative hierarchical name spaces in accordance with some embodiments of the invention.

FIG. 2 is a block diagram illustrating a system for creating views of a system or global name space by applying a set of rules when an alternative hierarchical name space is constructed. Directives for accessing the nodes in the view may be stored in the view so that when a request for access to a node is received, the directives are dynamically evaluated and enforced, enabling or denying access. In some embodiments, the alternative hierarchical name space restrict access to resources based on the process placed in the silo rather than permissions associated with the user running the process In some embodiments the rules and directives are evaluated and further restrict permissions enforced by ACLs. System 200 may reside on a computer such as the one described above with respect to FIG. 1. System 200 may include one or more partitions such as partition 202, etc. A drive letter abstraction may be provided at the user level to distinguish one partition from another. For example, the path C:\WINDOWS\ may represent a directory WINDOWS on the partition represented by the letter C. Each drive letter or partition may be associated with a hierarchical data structure. Each hierarchy has a root which represents the first or top-most node in the hierarchy. It is the starting point from which all the nodes in the hierarchy originate. As each device may be partitioned into multiple partitions, multiple roots may be associated with a single device. (For example, a user's physical hard disk may be partitioned into multiple logical "disks", each of which have their own "drive letter" and their own root.) A single instance of the operating system images serves all the partitions of the computer in some embodiments of the invention.

Within each partition, system 200 may include a system environment 201 and a number of isolated environments. In some embodiments of the invention, the isolated environments are silos. The system environment 201 may include or be associated with a number of name spaces including but not limited to one or more of: a system processes name space 250, a system objects name space 252 and a file system name space 254. System 200 may also include an operating system 280. The operating system 280 may include one or more operating system components including but not limited to an operating system kernel 281 and an object manager 282. In some embodiments of the invention, the object manager resides within the kernel. System 200 may also include other components not here shown but well known in the art.

System 200 may include one or more side-by-side silos 204, etc. in each partition or associated with each drive letter. Each silo in some embodiments is associated with its own silo process name space, silo object name space and silo file system name space but shares a single operating system instance with all the processes in the system. For example, in FIG. 2, silo 204 is associated with silo processes name space 208, silo objects name space 262 and silo file system name space 264. Silo 204, etc. does not however, have its own operating system instance. That is, for example, silo 204 is served by the same operating system instance (operating system 280) that serves the system environment 201 and any other silos that may exist. Silo 204, etc. may include one or more child silos 210, etc. Silo 210 itself may include one or more child silos and so on to any degree of nesting. Child silo 210 in FIG. 2 is associated with child silo processes name space 270, child silo objects name space 272 and child silo file system name space 274 but is served by the same operating system instance that serve all the other environments. A child silo may be created by a process running in its parent silo. For example, in FIG. 2, a process in silo processes name space 208 may have created child silo 210 by creating a view into the silo 204 name space, as described more fully below. A process may not escape from its silo. For example a process in silo processes name space 208 may not escape from silo 204. Similarly, a child process of child silo processes name space 270 may not escape from child silo 210. Furthermore, the smallest entity capable of being siloed (placed in its own silo) is a process. A sub-process cannot be siloed.

Rules specifying allowable capabilities for a process running in the silo may be provided to the rules engine 284. Rules may be provided in any suitable format. For example, rules may be declaratively provided in the form of attributes in an XML file or XML document that defines a silo's view of resources. In some embodiments of the invention, the XML file is used to create the view for the silo. Directives for accessing nodes in the view may be stored in the nodes of the view as it is constructed. That is, during construction of a hierarchy, the rules engine may receive a set of rules, evaluate them and associate appropriate directives for accessibility with nodes representing the resource.

Directives stored within the view may limit the access of a process in a silo to a node to which the directives are applied. Access may be limited by rewriting the access capabilities returned with the handle to the node. In some embodiments of the invention, directives are applied in sequence. In some embodiments a linked list is the data structure that implements the sequencing of directives. Directives may be applied when an access request is received for a resource associated with a directive and may be applied to all nodes beneath a junction. When an access request is received for a resource (such as a file name, for example), the file name and the directives list is passed to the engine for evaluation. Each rule in the directives list is evaluated. If the end result of processing the rules results in specification of an object in the silo name space, access to the resource is allowed and a handle to the node is returned to the caller. If the end result of processing the rules results in specification of an object that does not exist in the silo name space, the request fails.

Figure 3:
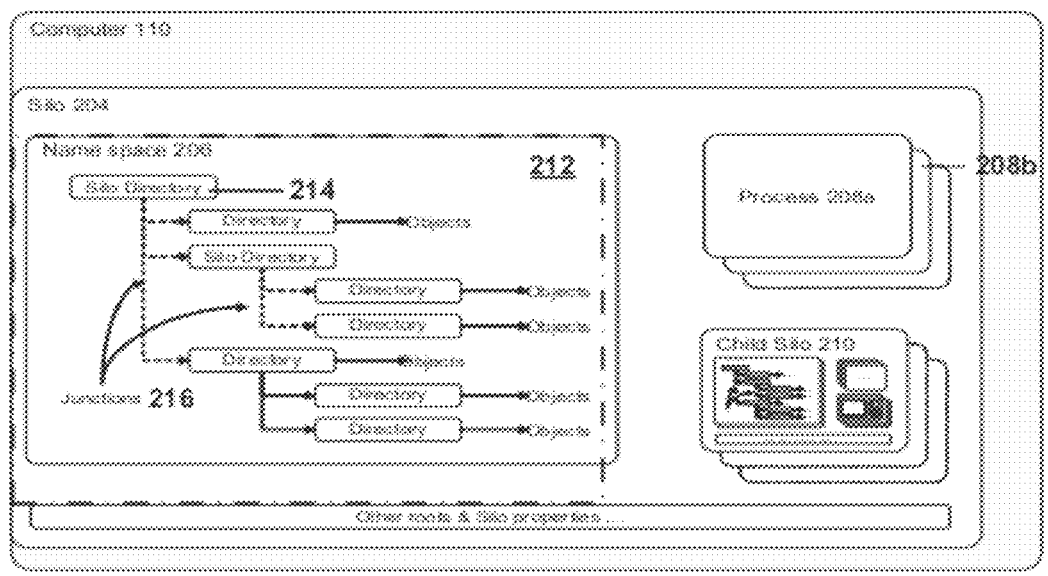
FIG. 3 is another block diagram of a system for creating and using alternative hierarchies by applying a set of rules to create views of hierarchical name spaces in accordance with some embodiments of the invention.

FIG. 3 is a more detailed illustration of a portion 300 of system 200. In FIG. 3, name space 206 of silo 204 on computer 110 may represent the file system name space, the object manager name space, the registry name space or other hierarchical name space. Each name space may have its own silo-specific root. For example, each silo (parent silo 204, child silo 210) may have its own virtual root for the file system (e.g., the virtual root directory 212 illustrated within name space 206 for silo 204 may be a file system virtual root directory) for each physical volume exposed to the silo. Similarly, each silo (parent silo 204, child silo 210) may have its own silo root for the registry (e.g., the root node 214 illustrated within name space 206 for silo 204 may be a registry root). Similarly, each silo (parent silo 204, child silo 210) may have its own root for a branch of the system object manager name space in the system environment (not shown). The root for the silo may or may not have the same set of nodes or entries as the corresponding physical global name space of the volume, but typically it does not. The silo hierarchy may include junctions or links back to the physical name space, which is discussed in more detail with respect to FIGS. 4a-c. The processes in the silo therefore can be given an alternate view of the global name space on the physical volume. Additionally a set of operations can be applied to hierarchies enabling hierarchies or nodes within the hierarchies to be marked read-only, read/write, etc. when accessed via the silo. Rules may be applied in the construction of the silo hierarchy and may be stored in the form of directives associated with the nodes of the silo hierarchy. These directives may be evaluated and enforced when a node in the silo hierarchy is accessed.

Thus the global name space for resources may be overridden by a silo-specific version of the name space (the virtual hierarchy for the file system, a branch of the physical hierarchy for the object manager, an independent physical hierarchy for the registry, etc.) that restricts the access of processes within the silo to the resources to those appearing within the virtual hierarchy. Processes may be assigned to the silo based on characteristics associated with the process so that resources can be restricted for processes in the silo based on the process instead of based on the user running the process. Each silo may override portions of the global file system name space. Similarly each silo may override portions of the global registry name space or other name space. If the silo is a child silo, portions of the parent silo name spaces can be overridden by the child silo name space. For example, when a process such as process 208a running within a silo (e.g., silo 204) attempts to access a particular part of the file system, the access may be redirected to a silo-specific version of the file system. Similarly, when a process such as process 208a running within a silo (e.g., silo 204) attempts to access a particular part of the registry (e.g., a key in the registry), the access may be redirected to a silo-specific version of the registry key. The silo's view of the registry may expose portions of the registry as read only, even though the same process running with the same user's token may have read-write access to the file when run from outside a silo or from a different silo.

Figure 4A:
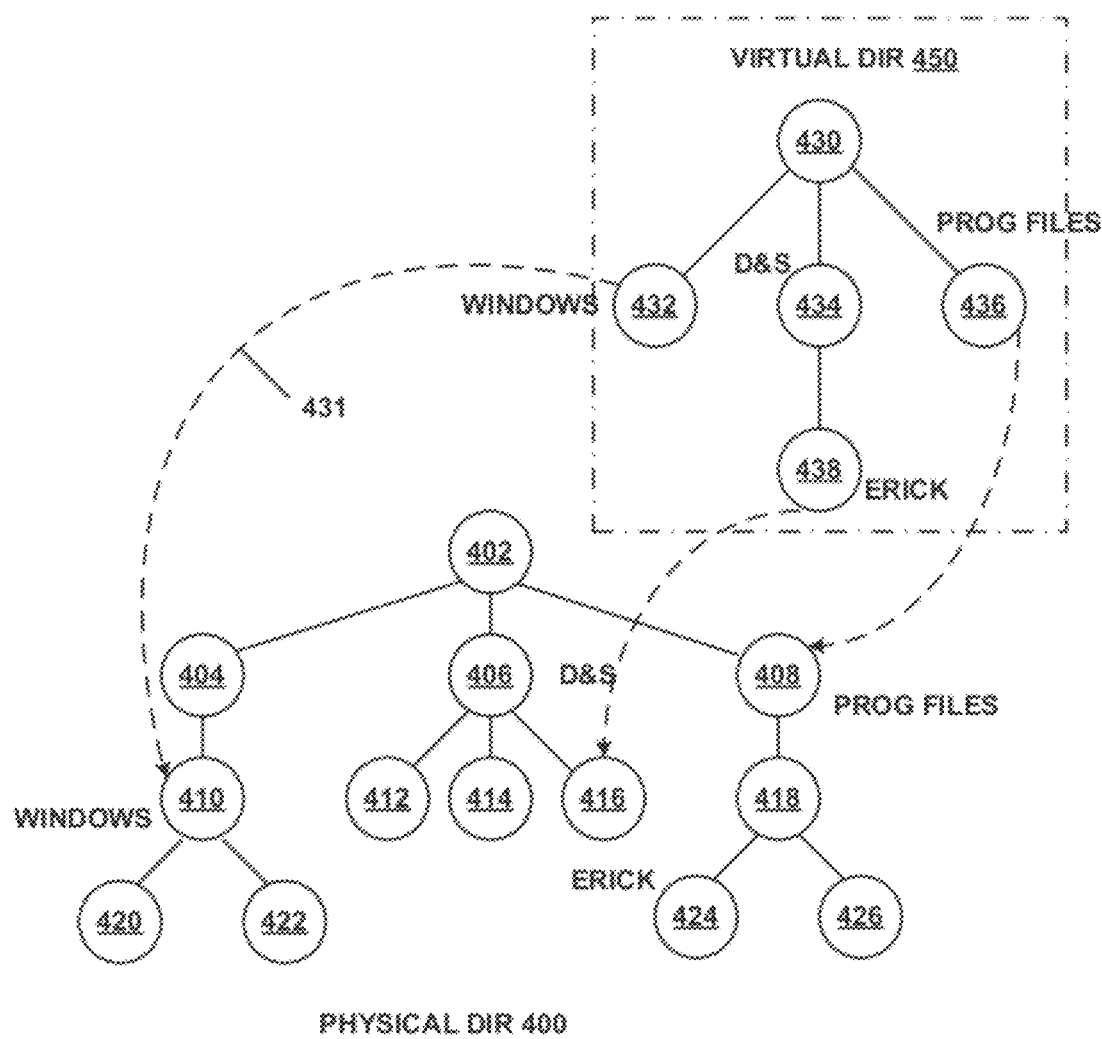
FIGS. 4a-c are block diagrams illustrating the creation of hierarchies by applying a set of rules to create views in accordance with some embodiments of the invention.
Figure 4B:
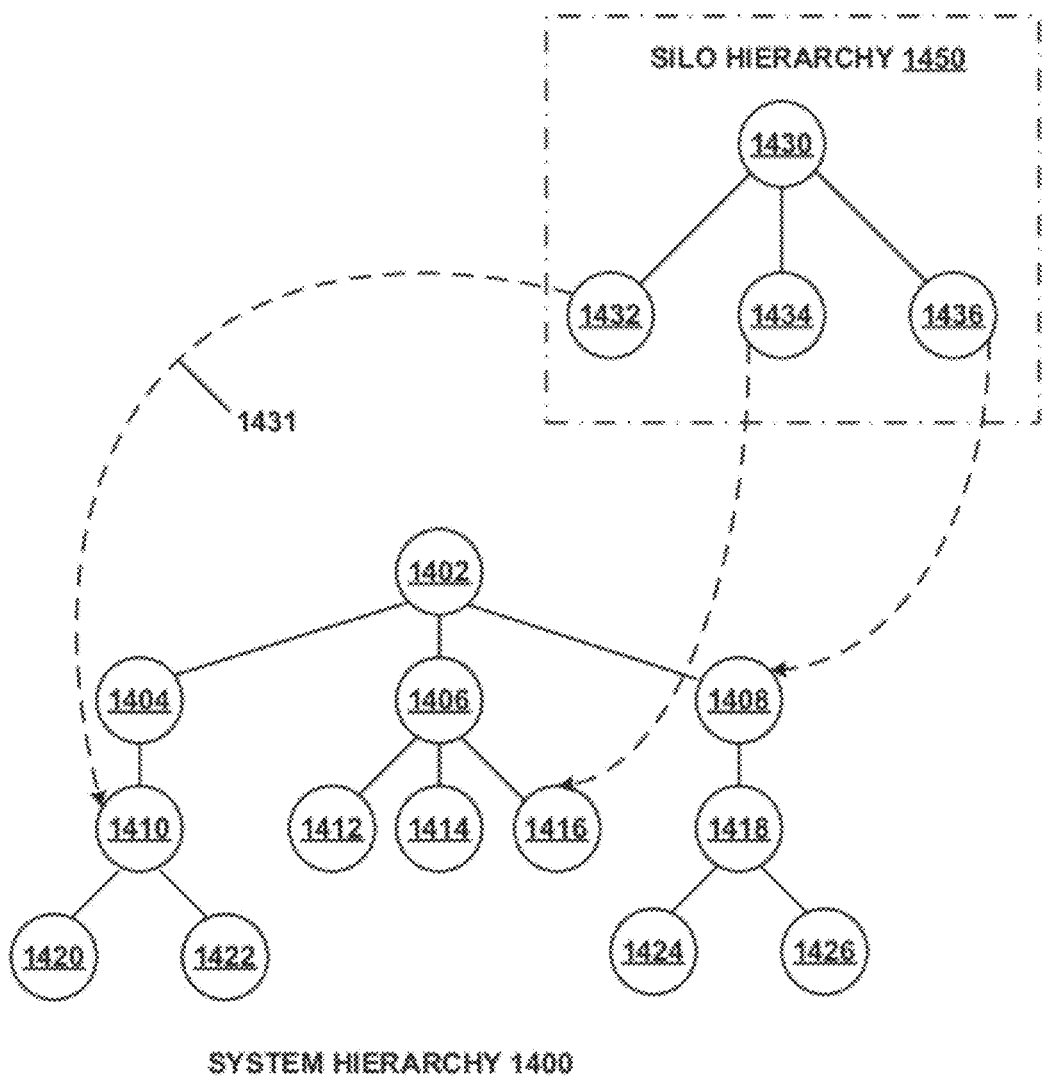
Figure 4C:
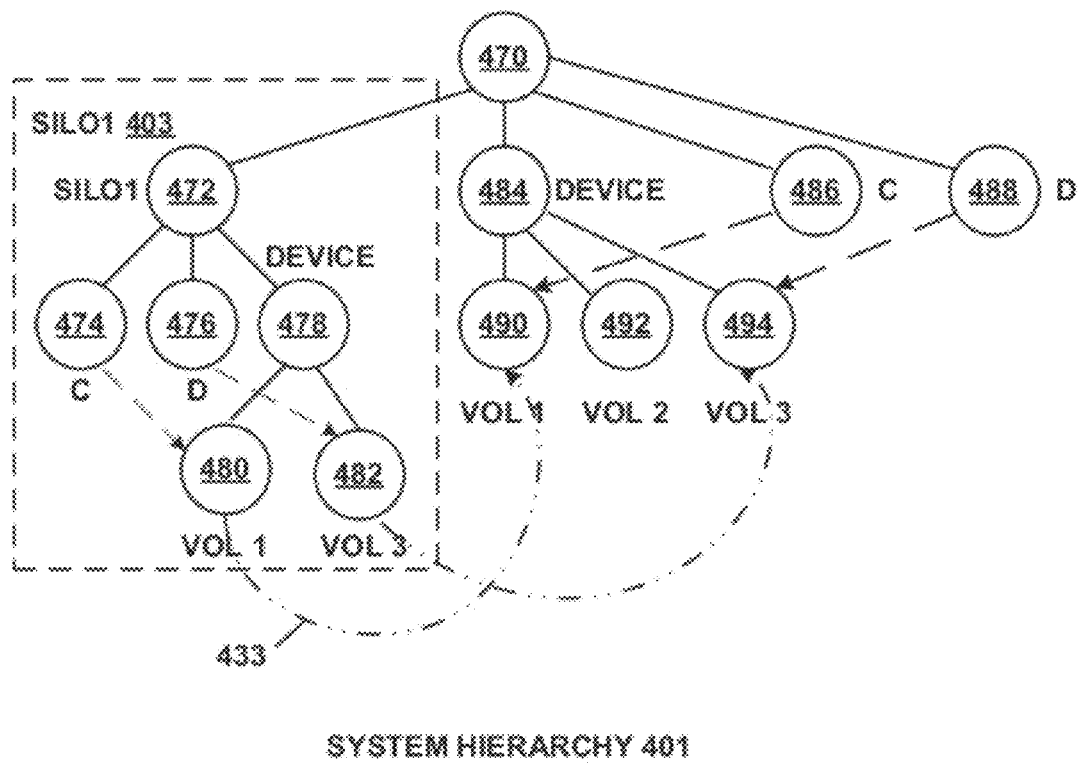
Figure 4D:
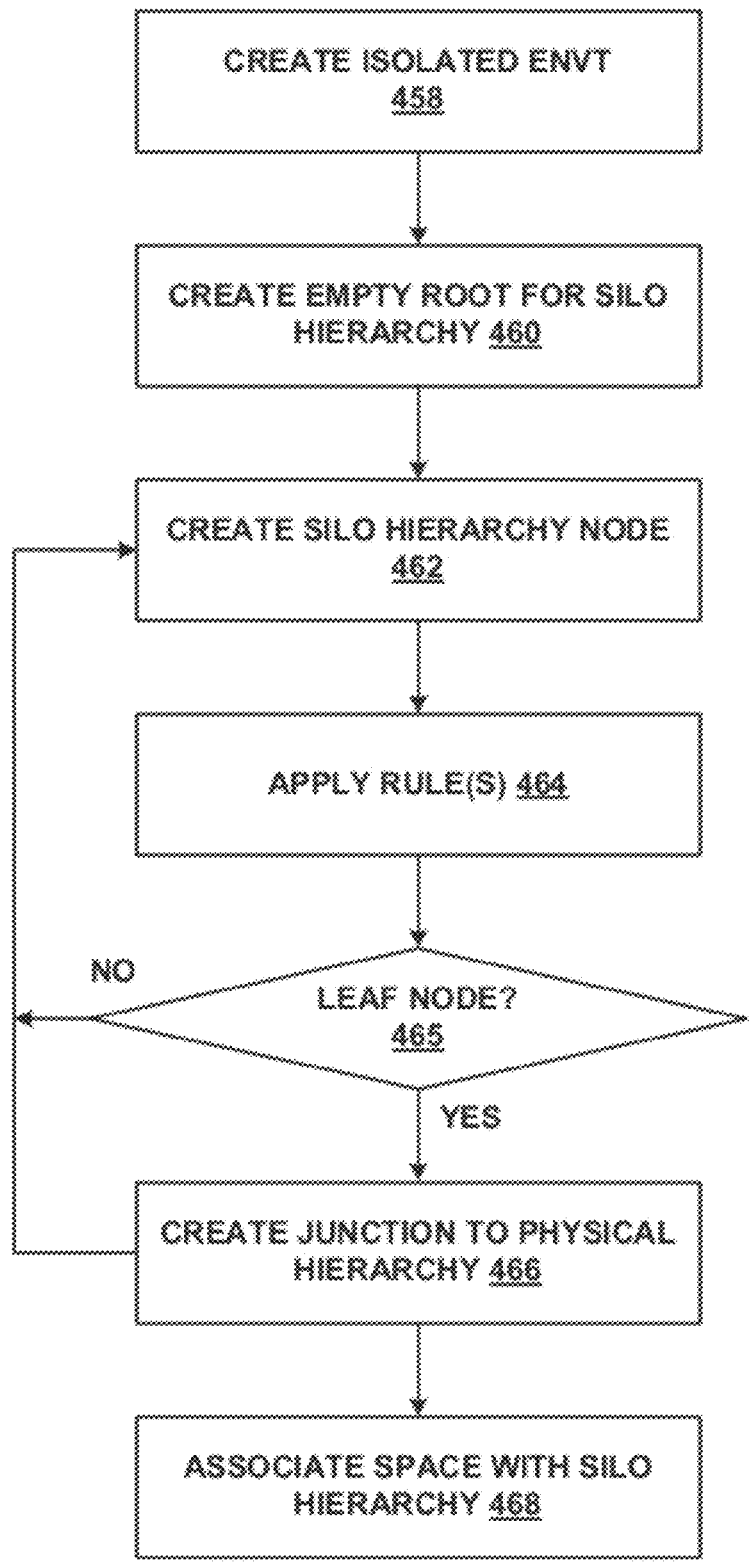
FIG. 4d is a flow diagram of a process for creating an isolated environment in accordance with some embodiments of the invention.

FIG. 4d represents the creation of an isolated environment, (e.g., a silo). FIGS. 4a-4c illustrate the creation of a silo hierarchy for the isolated environment. Referring now to FIG. 4d, at 458, an isolated environment (silo) is created. At 460 a silo root for the silo hierarchy is created. At 462 a node within the silo hierarchy is created. At 464 rules associated with the node are applied. At 465, if the node is a leaf node, a junction to the global system hierarchy may be created (466). This process may be repeated for each node in the silo hierarchy. After all the silo nodes have been created, the silo hierarchy is associated with the isolated environment. The silo hierarchy may be associated with the silo (468) by, for example, setting the silo hierarchy to be the default registry for the silo, or by setting the silo hierarchy to be the default file system for the silo and so on.

To illustrate the creation of a virtual hierarchy for a silo, the following example is directed to the creation of a virtual file system directory for the silo, but it will be understood that the process also applies to the creation of an alternative registry or other alternative hierarchical name space. In FIG. 4*a* the tree structure outside of the dotted box illustrates an exemplary physical file system directory 400, as it exists in non-volatile storage. Node 402 is the root node. Nodes 404, 406 and 408 represent child nodes of node 402. Nodes 404, 406 and 408 are first level nodes. Node 410 is a child node of node 404, nodes 412, 414 and 416 are child nodes of node 406 and node 418 is a child node of node 408. Nodes 410, 412, 414, 416 and 418 are second level nodes. Nodes 420 and 422 are child nodes of node 410 and nodes 424 and 426 are child nodes of node 418. Nodes 420, 422, 424 and 426 are third level nodes. Physical directory 400 may represent the global hierarchical file system directory for processes in the system environment 201 and may represent, for example, the following:

- Node 402 may represent the C drive
- Node 406 may represent the Documents and Settings folder or sub-directory.
- Node 408 may represent the Program Files folder or sub-directory.
- Node 410 may represent the WINDOWS folder or sub-directory.
- Nodes 412, 414 and 416 may represent user folders or sub-directories, (e.g., node 412 may be user Madhu's folder, node 414 may be user Jeff's folder and node 416 may be user Erick's folder).

Virtual hierarchy 450 (enclosed in the dotted box) may represent a virtual file system directory that may be created in memory (volatile storage) for a silo such as silo 204 of FIG. 3, created at step 458. Virtual hierarchy 450 exists independently of physical hierarchy 400. Physical hierarchy 400 is unaffected by the creation, use, or operations on virtual hierarchy 450. An empty virtual root node 430 is created (FIG. 4*d*, 460). Then virtual directory nodes are created (462). For example, in FIG. 4*a*, nodes 432, 434, 436 and 438 may be created. Nodes may be created on one or more sub-root levels. For example, nodes 432, 434 and 436 are first level nodes and node 428 is a second level node. Any number of levels of nodes may be created. Nodes may be created on one or more sub-root levels. (In FIG. 4*a*, this is represented by the creation of a second sub-root level of nodes, i.e., node 438.) For each node, an access capability may be assigned (464) via an access mask. Junctions may then be created to the physical hierarchy (i.e., to the file system directory in the example) on non-volatile storage (466). A junction may be created from a leaf node such as leaf node 432, leaf node 436 and/or leaf node 438 to a node in the underlying physical directory. For example, in virtual directory 450 a junction 431 (junctions are indicated in the figures by dashed arrows) extending from leaf node 432 of virtual directory 450 to node 410 of physical directory 400 has been created, a junction from leaf node 436 of virtual directory 450 to node 408 of physical directory 400 has been created, and a junction from leaf node 438 of virtual directory 450 to node 416 of physical directory 400 has been created. It is not necessary to name nodes in the alternative hierarchy the same as corresponding nodes in the global hierarchy. For example, the node named Erick in physical directory 400 may be named ErickX in virtual directory 450. For example, the node named Erick in physical directory 400 may be named ErickX in virtual directory 450.

FIG. 4*b* illustrates another type of silo hierarchy, such as a silo registry, but it will be understood that the process also applies to the creation of a view of other hierarchical name spaces. In FIG. 4*b* the tree structure outside of the dotted box illustrates an exemplary physical hierarchy 1400, as it exists in volatile or non-volatile storage. Node 1402 is the root node. Nodes 1404, 1406 and 1408 represent child nodes of node 1402. Nodes 1404, 1406 and 1408 are first level nodes. Node 1410 is a child node of node 1404, nodes 1412, 1414 and 1416 are child nodes of node 1406 and node 1418 is a child node of node 1408. Nodes 1410, 1412, 1414, 1416 and 1418 are second level nodes. Nodes 1420 and 1422 are child nodes of node 1410 and nodes 1424 and 1426 are child nodes of node 1418. Nodes 1420, 1422, 1424 and 1426 are third level nodes. Physical hierarchy 1400 may represent the global hierarchical registry for processes in the system environment 201 and may represent, for example, the following:

- Node 1402 may represent HKLM or HKEY_LOCAL_MACHINEs
- Node 1406 may represent HARDWARE
- Node 1408 may represent SYSTEM.
- Node 1410 may represent SOFTWARE.
- Nodes 1412, 1414 and 416 may represent CurrentControlSet, Setup, and WPA.

Silo hierarchy 1450 (enclosed in the dotted box) may represent a silo-specific registry that may be created in memory (volatile storage) for a silo such as silo 204 of FIG. 3, created at step 458. Silo hierarchy 1450 exists independently of physical hierarchy 1400. Physical hierarchy 1400 is unaffected by the creation, use, or operations on silo hierarchy 1450. An empty silo root node 1430 is created (FIG. 4*d*, 460). Then silo hierarchy nodes are created (462). For example, in FIG. 4*b*, nodes 1432, 1434, and 1436 may be created. Nodes may be created on one or more sub-root levels, but typically for a registry, only one level of sub-root nodes is created. For example, nodes 1432, 1434 and 1436 are first level nodes. Junctions may then be created to the physical hierarchy (i.e., to the system registry in the example) in volatile storage (466). A junction may be created from a leaf node such as leaf node 1432, leaf node 1434 and/or leaf node 1436 to a node in the underlying physical hierarchy. For example, in silo hierarchy 1450 a junction 1431 (junctions are indicated in the figures by dashed arrows) extending from leaf node 1432 of silo hierarchy 1450 to node 1410 of physical hierarchy 1400 has been created, a junction from leaf node 1434 of silo hierarchy 1450 to node 1416 of physical hierarchy 1400 has been created, and a junction from leaf node 1436 of silo hierarchy 1450 to node 1408 of system hierarchy 1400 has been created. It is not necessary to name nodes in the silo hierarchy the same as corresponding nodes in the physical hierarchy. For example, the node named WPA in physical hierarchy 1400 may be named something else in silo hierarchy 1450.

FIG. 4*d* may also represent a flow diagram for creating an alternative view of a global name space for an isolated environment in which the view is created by adding a branch to an existing system hierarchy. That is, FIG. 4*d* may illustrate the creation of a silo branch of a system hierarchy for the isolated environment. Referring now to FIG. 4*d*, at 458, an isolated environment (silo) is created. At 460 a root for a silo hierarchy is created. At 462 a node within the silo hierarchy is created. At 464, if the node is a leaf node, a junction to the physical hierarchy may be created (466). This process is repeated for each node in the silo hierarchy. After all the nodes have been created, the silo hierarchy is added to the system hierarchy and is associated with the isolated environment. The silo hierarchy may be associated with the silo by, for example, setting the silo branch to be the default object manager name space for the silo.

To illustrate the creation of such a silo hierarchy, the following example is directed to the creation of a silo object manager branch of a global object manager hierarchy, but it will be understood that the process also applies to the creation of a view of other hierarchical name spaces. In FIG. 4c the tree structure outside of the dotted box illustrates an exemplary system hierarchy 401, as it exists in volatile or non-volatile storage. Node 470 is the root node. Nodes 484, 486 and 488 represent child nodes of node 470. Nodes 484, 486 and 488 are first level nodes. Nodes 490, 492, and 494 are child nodes of node 484. Nodes 490, 492, and 494 are second level nodes. System hierarchy 401 may represent the global hierarchical object manager space for processes in the system environment 201 and may represent, for example, the following:

Node 470 may represent the top level (root) node of an object manager name space
Node 484 may represent the device
Node 486 may represent the C drive.
Node 488 may represent the D drive.
Nodes 490, 492 and 494 may represent hard disk volume 1, hard disk volume 2 and hard disk volume 3, respectively.

Silo branch 403 (enclosed in the dotted box) may represent a silo-specific branch of the object manager name space that may be created in memory (volatile storage) for a silo such as silo 204 (silo1) of FIG. 3, created at step 458 and added to the system object manager name space. To create silo branch 403 an empty silo root node 472 is created (FIG. 4d, 460). Then silo hierarchy nodes are created (462). For example, in FIG. 4c, nodes 474, 476, and 478 representing the silo C drive, the silo D drive and the silo device may be created. Nodes 480 and 482 may be created representing the silo's hard disk volume 1 and the silo's hard disk volume 3 respectively. Nodes may be created on one or more sub-root levels. For example, nodes 474, 476 and 478 are first level nodes. Nodes 480 and 482 are second level nodes. Junctions between nodes 474 and 480 and between 478 and 482 are normal symbolic links. Junctions may then be created to the system hierarchy (i.e., to the system object manager name space in the example) in volatile storage (466). A junction may be created from a leaf node such as leaf node 480 or leaf node 482 to a node in the system hierarchy. For example, in silo branch 403 a junction created via a silo-specific symbolic link such as symbolic link 433 extending from leaf node 480 of silo branch 403 to node 490 of system hierarchy 401 has been created, and a symbolic link junction from leaf node 482 of silo branch 403 to node 494 of system hierarchy 401 has been created. It is not necessary to name nodes in the silo branch the same as corresponding nodes in the system hierarchy. For example, the node named Hard disk VOL1 in global hierarchy 401 may be named HD VOL1 in silo branch 403.

When a process in silo 204 accesses node 436 of the silo's virtual directory 450 (e.g., C:\Program Files), node 408 (e.g., the Program Files directory of the physical directory 400) will be accessed. Similarly, when a process in silo 204 accesses node 432 of the silo's virtual directory 450 (e.g., C:\WINDOWS), node 410 (e.g., the WINDOWS directory of the physical directory 400) will be accessed. If a process in silo 204 accesses node 434 of the silo's virtual directory 450 and enumerates the list of child nodes of node 434, only node 438 will appear in the list. For example, suppose a process outside the silo requests an enumeration of the users in the Documents and Settings directory (C:\Documents and Settings\). The list of users will include child nodes 412, 414 and 416 (e.g., Madhu (node 412), Jeff (node 414) and Erick (node 416)). A process inside the silo that makes the same request will return a list including only Erick because node 438 is the only child node of node 434 of virtual directory 430, hence creating a "view" of the global name space. Node 438 of the virtual directory 450 points to node 416 of the physical directory 400. Furthermore, if a process in silo 204 attempts to access nodes 412 and 414 of physical directory 400, the process will be unable to do so because that name is not able to be resolved in the process' name space. For example, if a process in silo 204 attempted to open the file represented by node 412 (e.g., C:\Documents and Settings\Madhu\), it will be unable to because the name cannot be resolved in the virtual directory (the silo's file system name space).

It will be appreciated that a junction from any node of a virtual directory may be established to any node of a physical directory. Furthermore, it will be appreciated that any node in the physical directory that exists above the junction will be unavailable to any process using the virtual directory. For example, nodes 402, 404 and 406 are unavailable to a process whose virtual directory is virtual directory 450. Furthermore, it will be appreciated that additional levels of nodes may exist between the virtual root node and the leaf nodes in the virtual directory hierarchy. Any number of sub-root levels may exist in a virtual directory hierarchy.

Each node in the silo directory may include one or more of the following pieces of information:

a pointer to a physical directory node or a string representing the name of the physical directory node
rules or directives concerning access capabilities associated with the node or the node's children
a linked list or other suitable data structure representing a set of children nodes for the node
an access mask. An access mask is a 32-bit value containing the permissions that are allowed or denied in the ACE (Access Control Entry), which is used in an ACL (Access Control List). When an object is opened, the Access Mask is used to request access rights.

In some embodiments of the invention, when a junction to the global hierarchy is reached, the access capabilities for all the nodes below the junction are by default set to the access capability for the junction node. In some embodiments of the invention, additional directives may be applied to the nodes below the junction, as described more fully below. For example, in FIG. 4a if the junction 431 from virtual directory node 432 specifies read-only access, nodes 410, 420 and 422 by default would only have read-only access to any process that reaches those nodes via virtual directory 450. The capabilities available to the process running in the silo to a child node may also be restricted by rules associated with the child's parent node. These rules are evaluated before access to the child node is granted to a process in a silo. For example, suppose that although junction 431 specifies that access to nodes 410, 420 and 422 is read only, node 420 is to be hidden and node 422 should be read/write. This result may be obtained by associating an additional set of directives with node 410. Whenever access to a child node of node 410 is received from a process running in a silo associated with silo hierarchy 450, the directives associated with node 410 are evaluated to determine allowed access. A process in the silo that tries to access a name in the silo name space will specify the type of access desired. For example, if a process in the silo wants to open C:\Documents and Settings\Erick\ for writing, the open statement will include an indicator requesting the ability to read and write to the file. If access is granted, the handle that is returned to the process to enable the process to use the file, will include the permissions associated with access, that is, what type of access is allowed (e.g., read-only or read/write). Furthermore, rules may be applied to nodes in the silo hierarchy to enable a silo to access a node (permit) or not to access a node (suppress). Rules may also change the default access capabilities of a process to the node. For example, referring again to FIG. 4a, suppose that the junction 431 specifies that access to the branch comprising nodes 410, 420 and 422 is read only. In this case, as described above, the access permissions returned in the handle to node 410 would be rewritten to specify read-only access. By default, read-only access would also be applied to any nodes directly or indirectly depending from node 410. Suppose, however, that it is desirable to hide node 420 and to allow read/write access to node 422. Such a result may be achieved by specifying rules associated with node 410. For example, the rules associate with node 410 to achieve this result might be: "Permit all nodes, hide 420, read/write 422". Rules may be specified in any suitable manner. In some embodiments of the invention, rules are stored via a linked list and are applied in order. Wildcards may be used when specifying rules in some embodiments of the invention. Suppose for example, a hierarchy such as a silo file system directory with a parent node called Nodes has 9 child nodes named Aa, Ab, Ac, Ba, Bb, Bc, Ca, Cb and Cc. A set of rules associated with sub-directory nodes may include the following:

Set 1: Suppress All Nodes/Permit Bb. The effect of this set of rules in some embodiments would be that only sub-directory Bb would be visible to a process running in the silo.

Set 2: Suppress All Nodes/Permit B*/Suppress Bc. The effect of this set of rules in some embodiments would be that child nodes Ba and BB would be visible.

In addition to suppressing and permitting access to nodes, the read/write access for a node may be altered by the rules.

Figure 5:
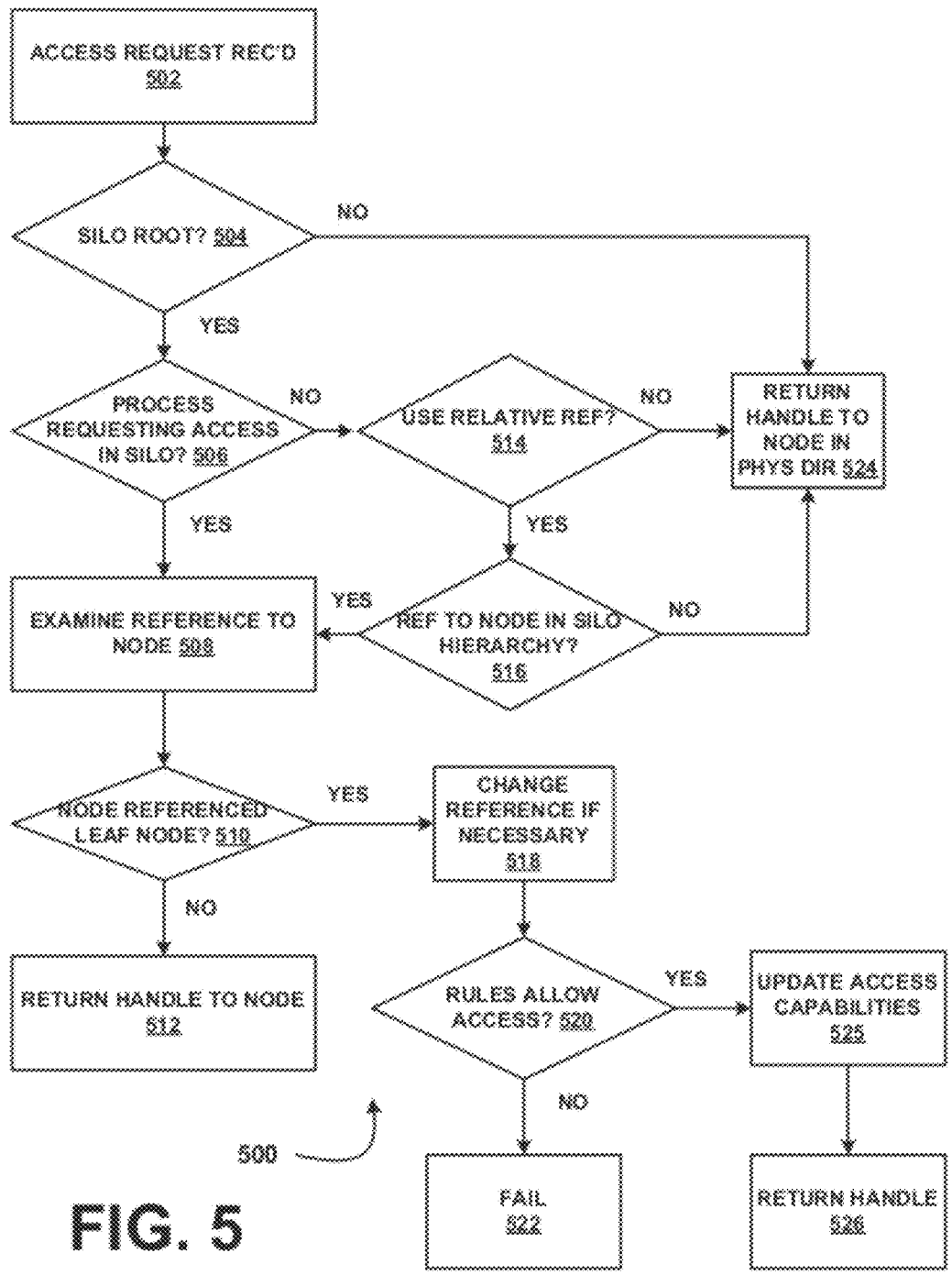
FIG. 5 is a flow diagram of a method of accessing a node in a virtual hierarchy in accordance with some embodiments of the invention.

FIG. 5 illustrates a process for accessing a node in a silo hierarchy, in accordance with some embodiments of the invention. At 502, a request for access to a node in a hierarchy is received. At 504, a check is made to determine if there is a silo hierarchy for the partition referenced. If there is no silo hierarchy for the partition, a handle is returned to a node in the appropriate physical hierarchy in the appropriate partition at 524. If there is a silo hierarchy for the partition, processing continues at 506. At 506, it is determined whether the process requesting access is in a silo or not in a silo. In some embodiments of the invention, whether or not the process requesting the access is in a silo and in which silo the process resides can be determined by the contents of a field in the process structure although any suitable method of determining this is contemplated by the invention. In some embodiments of the invention, the process structure is stored in kernel memory which is inaccessible to the process, making it impossible for the process to access or change the silo-identifying field. If the process requesting access to the node is not a silo process, the statement requesting access is examined to determine whether the statement uses a relative reference to the node or an explicit reference to the node (514). If an explicit reference is used, a handle is returned to a node in the appropriate physical directory on the appropriate partition at 524. If a relative reference to the node is used (516), the reference is resolved to determine if the node being accessed is a node in the silo hierarchy. If the node is a node in the silo hierarchy the reference to the node is examined at 508. If the node being accessed is not a node in the virtual directory, a handle is returned to a node in the physical hierarchy at 524.

At 510, if the node referenced is a node in the silo hierarchy and the node referenced is not a leaf node, a handle is returned to the node (512). If the node referenced is a leaf node, the name used to reference the node is changed to a name that can be resolved in the physical hierarchy (518). At 520, the rules engine determines if access is allowed to this node by examining the rules information (directives) stored at the node as described above. If access is not allowed, the request fails (522). If access is allowed, the access mask is updated (525) and any directives for the resource represented by the node are associated with the handle and the handle is returned (526). For example, suppose a request to open a file is received. Suppose that the specific request is "open C:\Documents and Settings\Erick with read/write access"). At 504 it may be determined that a silo (e.g., silo 204) exists on partition C. If the process requesting access to the Erick folder is a process such as a process of system processes 250 (i.e., a process outside the silo), a handle to node 416 of FIG. 4a may be returned. If the process requesting access to the Erick folder is a process such as process 208a (i.e., a process within the silo), the node to which access is being requested is node 438 of virtual directory 450. Node 438 is a leaf node, with a junction to node 416 in the physical directory. Suppose node 438 of virtual directory is named ErickX. In this case, the name would have to be changed to Erick in order to correctly be resolved in the physical directory. When the handle to C:\Documents and Settings\Erick is returned, the access capabilities of node 438 are returned with the handle. Suppose that ErickX is associated with the directive "suppress". In this case, access is not allowed and the request would fail.

Figure 6:
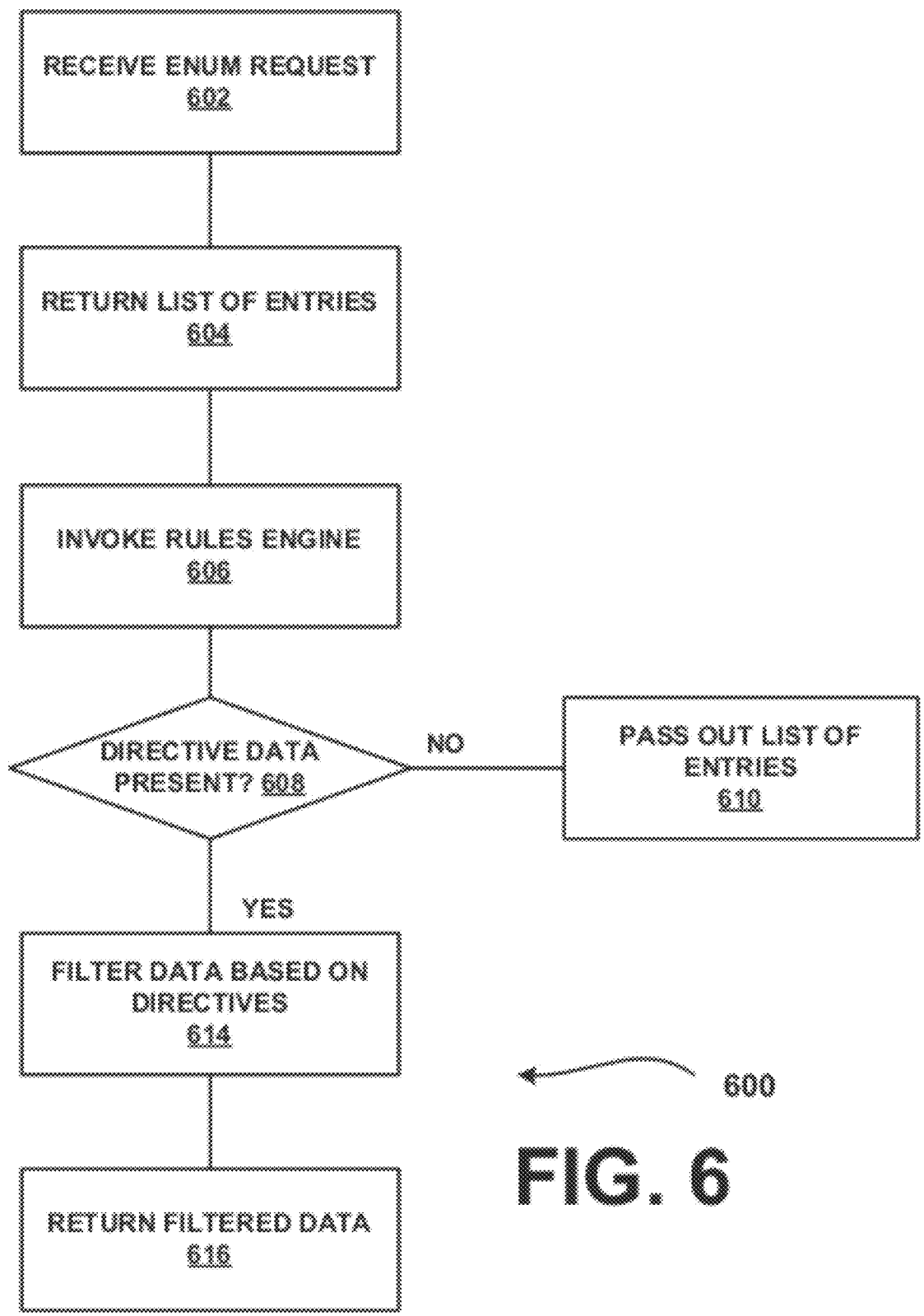
FIG. 6 is a flow diagram of a method of enumerating the nodes in a hierarchy in accordance with some embodiments of the invention.

FIG. 6 illustrates a process for enumeration of the child nodes of a particular node in accordance with some embodiments of the invention. At 602 an enumeration request is received. At 604 it is determined if the node for which the enumeration of child nodes is being requested is a node in a silo hierarchy, as for example, would occur if a process in a silo originated the request. If the node for which the enumeration is requested is a node in a silo hierarchy, the list of child nodes for the node in the silo hierarchy is returned. If not, the list of child nodes for the global hierarchy is returned. For example if the request: enumerate the child nodes of C:\Documents and Settings\ is received, it is determined whether the request refers to the physical directory or to the virtual directory. If the request refers to the virtual directory, (e.g., virtual directory 450, then the child nodes of node 434 are returned (node 438 which contains a pointer to node 416, e.g., Erick). If the request refers to the physical directory, (e.g., physical directory 400, the child nodes of node 406 are returned, e.g., Madhu, Jeff and Erick. In this way, a process in a silo associated with a virtual directory can be constrained to see only a designated portion of the global name space.

If the process making the request is a silo process, the rules engine is invoked (606). If directive data (608) is not present, the list of entries is returned (610). If directive data is present, the list of entries is filtered based on the directives (614), as described above and the filtered data is returned at 616.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for restricting access to resources comprising:
   a computing device comprising a processor;
   a memory in communication with the processor when the system is operational, said memory having stored therein:
   computer-readable instructions that upon execution by the processor cause an operating system module to serve a system environment and an isolated environment within the system environment, the system environment associated with a set of resources represented by a plurality of nodes of a global hierarchy, the isolated environment associated with a view of the set of resources wherein the view comprises a hierarchical arrangement distinct from an arrangement of the global hierarchy such that the view may comprise nodes from the global hierarchy in a dependency relationship that is different from the dependency relationship of the global hierarchy, the hierarchical arrangement of the view comprising a node not found in the global hierarchy;
   upon execution by the processor, the operating system module causing the generation of the view by creating a constrained-space-specific hierarchy comprising a subset of the plurality of nodes of the global hierarchy, the subset representing resources accessible to the isolated environment; and
   computer-readable instructions that upon execution cause a rules engine to receive and evaluate a set of declarative rules that when applied change the access capabilities for the resources accessible to the isolated environment represented by the view creating the constrained-space-specific hierarchy, wherein the rules engine evaluates the set of rules during construction of the constrained-space-specific hierarchy and associates directives representing the set of rules with nodes in the constrained-space-specific hierarchy, and wherein the constrained-space-specific hierarchy generated by application of the set of rules during construction of the constrained-space-specific hierarchy restricts a set of resources available to at least one process executing in the isolated environment by evaluating the directives during processing and enabling or denying access to a node in the constrained-space-specific hierarchy.

2. The system of claim 1, wherein the global hierarchy represents a global object manager name space for the system environment or a global registry for the system environment or a global file system for the system environment and wherein the constrained-space-specific hierarchy represents a view representing a subset of the system object manager name space, or a subset of the global registry name space or a subset of the global file system name space for the isolated environment.

3. The system of claim 1, wherein the resources accessible to the isolated environment are accessible to an entity, wherein the entity comprises a process, group of processes, program, group of programs, application or group of applications.

4. The system of claim 1, wherein the set of rules permit access to a node of the isolated environment-specific hierarchy or deny access to the node or change access capabilities of the node.

5. The system of claim 1, wherein the isolated environment is a silo.

6. The system of claim 1, wherein the isolated environment is a first isolated environment of a plurality of side-by-side isolated environments within the system environment.

7. The system of claim 1, wherein the isolated environment includes at least one level of nested isolated environments.

8. A method for restricting access to resources, comprising:
   serving, by an operating system module, a system environment and an isolated environment within the system environment, the system environment associated with a set of resources represented by a plurality of nodes of a global hierarchy, the isolated environment associated with a view of the set of resources wherein the view comprises a hierarchical arrangement distinct from an arrangement of the global hierarchy such that the view may comprise nodes from the global hierarchy in a dependency relationship that is different from the dependency relationship of the global hierarchy, the hierarchical arrangement of the view comprising a node not found in the global hierarchy;
   causing, by the operating system module, the generation of the view by creating a constrained-space-specific hierarchy comprising a subset of the plurality of nodes of the global hierarchy, the subset representing resources accessible to the isolated environment; and
   receiving and evaluating, by a rules engine, a set of declarative rules that when applied change the access capabilities for the resources accessible to the isolated environment represented by the view creating the constrained-space-specific hierarchy, wherein the rules engine evaluates the set of rules during construction of the constrained-space-specific hierarchy and associates directives representing the set of rules with nodes in the constrained-space-specific hierarchy, and wherein the constrained-space-specific hierarchy generated by application of the set of rules during construction of the constrained-space-specific hierarchy restricts a set of resources available to at least one process executing in the isolated environment by evaluating the directives during processing and enabling or denying access to a node in the constrained-space-specific hierarchy.

9. The method of claim 8, wherein receiving and evaluating the set of rules comprises:
   receiving an access request to the node in the isolated environment-specific hierarchy;
   evaluating the set of rules dynamically during processing associated with the node to determine if access to the node is allowed;

rewriting the access capability of the node; and
returning a handle to the node, the handle comprising the rewritten access capability of the node.

10. The method of claim 9, further comprising:
changing a name by which the node is referenced to reference a node in the global hierarchy.

11. The method of claim 8, wherein the isolated environment is a silo.

12. The method of claim 8, wherein the isolated environment is a first isolated environment of a plurality of side-by-side isolated environments.

13. The method of claim 8, wherein the resources accessible to the isolated environment are accessible to an entity, wherein the entity comprises a process, a group of processes, an application or a group of applications.

14. A computer-readable storage medium comprising computer-executable instructions that upon execution by a computing device cause operations comprising:
serving, by an operating system module, a system environment and an isolated environment within the system environment, the system environment associated with a set of resources represented by a plurality of nodes of a global hierarchy, the isolated environment associated with a view of the set of resources wherein the view comprises a hierarchical arrangement distinct from an arrangement of the global hierarchy such that the view may comprise nodes from the global hierarchy in a dependency relationship that is different from the dependency relationship of the global hierarchy, the hierarchical arrangement of the view comprising a node not found in the global hierarchy;
causing, by the operating system module, the generation of the view by creating a constrained-space-specific hierarchy comprising a subset of the plurality of nodes of the global hierarchy, the subset representing resources accessible to the isolated environment; and
receiving and evaluating, by a rules engine, a set of declarative rules that when applied change the access capabilities for the resources accessible to the isolated environment represented by the view creating the constrained-space-specific hierarchy, wherein the rules engine evaluates the set of rules during construction of the constrained-space-specific hierarchy and associates directives representing the set of rules with nodes in the constrained-space-specific hierarchy, and wherein the global hierarchy represents a global object manager name space for the system environment or a global registry for the system environment or a global file system for the system environment and wherein the constrained-space-specific hierarchy represents a view representing a subset of the system object manager name space, or a subset of the global registry name space or a subset of the global file system name space for the isolated environment.

15. The computer-readable medium of claim 14, wherein evaluating the set declarative rules comprises:
permitting access to the node of the global hierarchy, deny access to the node of the global hierarchy or changing an access capability associated with the node of the global hierarchy.

16. The computer-readable medium of claim 14, further comprising computer-executable instructions that upon execution by the computing device, cause operations comprising:
generating a registry, a file system or an object manager name space.

* * * * *